US012640992B2

(12) United States Patent
Puente Pestaña

(10) Patent No.: US 12,640,992 B2
(45) Date of Patent: May 26, 2026

(54) METHODS AND APPARATUS RELATING TO MACHINE-LEARNING IN A COMMUNICATIONS NETWORK

(71) Applicant: Telefonaktiebolaget LM Ericsson (publ), Stockholm (SE)

(72) Inventor: Miguel Angel Puente Pestaña, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 686 days.

(21) Appl. No.: 17/927,019

(22) PCT Filed: Jul. 1, 2020

(86) PCT No.: PCT/EP2020/068469
§ 371 (c)(1),
(2) Date: Nov. 22, 2022

(87) PCT Pub. No.: WO2021/244763
PCT Pub. Date: Dec. 9, 2021

(65) Prior Publication Data
US 2023/0224226 A1     Jul. 13, 2023

(30) Foreign Application Priority Data
Jun. 3, 2020    (EP) ..................................... 20382481

(51) Int. Cl.
*H04L 41/16*       (2022.01)
*H04L 41/042*      (2022.01)
*H04L 41/142*      (2022.01)

(52) U.S. Cl.
CPC ............ *H04L 41/16* (2013.01); *H04L 41/042* (2013.01); *H04L 41/142* (2013.01)

(58) Field of Classification Search
CPC ....... G06N 3/098; H04L 41/16; H04L 41/042; H04L 41/142
See application file for complete search history.

(56) References Cited

U.S. PATENT DOCUMENTS

2021/0203565 A1* 7/2021 Arora ........................ G06N 5/04
2022/0329493 A1* 10/2022 Hong ..................... H04L 41/16
(Continued)

OTHER PUBLICATIONS

3GPP, "3GPP TS 23.288 V16.4.0", 3rd Generation Partnership Project; Technical Specification Group Services and System Aspects; Architecture enhancements for 5G System (5GS) to support network data analytics services (Release 16), Jul. 2020, 1-66.
(Continued)

*Primary Examiner* — Margaret G Webb
(74) *Attorney, Agent, or Firm* — Murphy, Bilak & Homiller, PLLC

(57)          ABSTRACT

Aspects of the disclosure provide a method performed by a central Network Data Analytics Function (NWDAF) in a communications network. The communications network comprises one or more local NWDAFs configured to develop a model using federated learning, in which each local NWDAF stores a copy of the model and trains the copy of the model by inputting training data into a machine-learning process. The method comprises receiving, from the one or more local NWDAFs, a respective local model update comprising an update to values of one or more parameters of the model generated by training a respective copy of the model using machine-learning. The method further comprises combining the local model updates received from the one or more local NWDAFs to obtain a combined model update.

9 Claims, 11 Drawing Sheets

200

(56)                    References Cited

U.S. PATENT DOCUMENTS

2023/0083982 A1*    3/2023    Xin ......................... H04L 41/16
                                                    709/223
2023/0146099 A1*    5/2023    Ouyang .................. H04L 41/16
                                                    709/223

OTHER PUBLICATIONS

3GPP, "3GPP TS 23.501 V16.4.0", 3rd Generation Partnership Project; Technical Specification Group Services and System Aspects; System architecture for the 5G System (5GS); Stage 2 (Release 16), Mar. 2020, 1-430.

China Mobile, et al., "KI #2, New Sol, Federated Learning among Multiple NWDAF Instances", 3GPP TSG-WG SA2 Meeting #139E e-meeting, S2-2004029, (revision of S2-200xxxx), Elbonia, Jun. 1-12, 2020, 1-4.

China Mobile, et al., "New Key Issue: Functionality Separation from NWDAF", 3GPP TSG-SA WG2 Meeting #135, 82-1909970, (revision of S2-1909875/1908945/1908969), Split, Croatia, Oct. 14-18, 2019, 1-3.

Huawei et al., "Solution to multiple NWDAF instances", SA WG2 Meeting #136AH, S2-2001210, (merge of 82-2000854, 2000167), Incheon, Korea, Jan. 13-17, 2020, 1-7.

Isaksson, Martin, et al., "Secure Federated Learning in 5G Mobile Networks", Cornell University Library, arXiv:2004.06700v2 [cs. CR], 2014, 1-7.

Niknam, Solmaz, et al., "Federated Learning for Wireless Communications: Motivation, Opportunities and Challenges", Cornell University Library, arXiv:1908.06847v4 [eess.SP], 2020, 1-7.

Ov, Vishnu Ram, et al., "Architectural framework for machine learning in future networks including IMT-2020", International Telecommunication Union, Telecommunication Standardization Sector, Study Group 13, SG13-TD306/WP1, Victoria Falls, Mar. 4-14, 2019, 1-35.

* cited by examiner

Receiving, from the one or more local NWDAFs, a respective local model update comprising an update to values of one or more parameters of the model generated by training a respective copy of the model using machine-learning ⟿ 602

Combining the local model updates received from the one or more local NWDAFs to obtain a combined model update ⟿ 604

600

Inputting training data into a machine learning process to train a model to obtain a local model update, the local model update comprising an update to values of one or more parameters of the model — 702

Sending the local model update to a central NWDAF in the communications network — 704

700

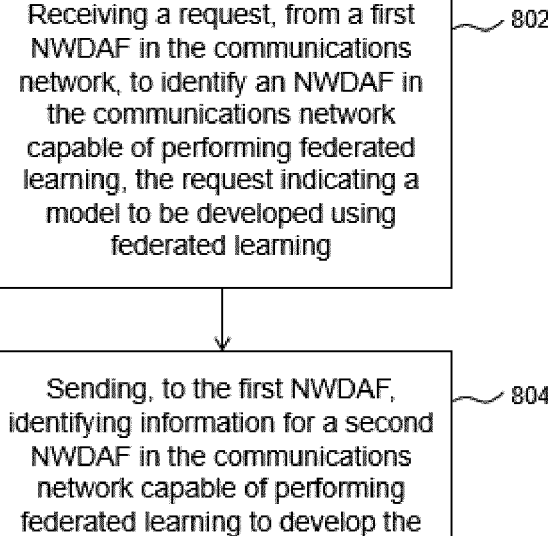

Receiving a request, from a first NWDAF in the communications network, to identify an NWDAF in the communications network capable of performing federated learning, the request indicating a model to be developed using federated learning — 802

Sending, to the first NWDAF, identifying information for a second NWDAF in the communications network capable of performing federated learning to develop the model — 804

METHODS AND APPARATUS RELATING TO MACHINE-LEARNING IN A COMMUNICATIONS NETWORK

TECHNICAL FIELD

Embodiments of the disclosure relate to machine-learning, and particularly to methods, apparatus and machine-readable media relating to machine-learning in a communications network.

BACKGROUND

Wireless communications networks typically comprise a radio access network, which provides a radio interface allowing wireless user devices (such as user equipments, UEs) to access the network, and a core network which enables the radio access networks to transmit data to external networks such as the internet. The core network may also provide a number of other functions, including mobility management, session management, transport for data packets, charging services, etc.

Core networks have evolved with the evolving mobile communication standards. For example, the General Packet Radio Services (GPRS) core network formed part of 2G, 3G and wideband code-division multiple access (WCDMA) mobile networks. For Long Term Evolution (LTE), the Evolved Packet Core (EPC) was developed. For the fifth generation of mobile networks, known as 5G, 3GPP has developed the so-called 5G core network (5GC). The 5GC has a service-based architecture, meaning that interactions between different network entities (typically implemented virtually and referred to as "functions") can be implemented in terms of a registration and subscription model. Network entities register themselves with the core network (and particularly register the services that they can provide), and then receive requests for that service or subscriptions to that service from other network entities. Similarly, a network entity which is registered with the core network can itself request services of other network entities. For example, a first network entity may subscribe to receive event notifications from one or more second network entities.

The 3GPP standards define a large number of different network entities, as well as the rules governing interactions with those entities. One such network entity is the Network Data Analytics Function (NWDAF), which is tasked with collating information on the performance of the network and providing analytics on that data. The NWDAF may form part of a network architecture as described in the 3GPP Technical Specification 23.501, "System architecture for the 5G System", version 16.4.0. The NWDAF interacts with different entities for different purposes, as follows:

Data collection based on event subscription;
Retrieval of information from data repositories;
Retrieval of information about Network Functions (NFs); and
On-demand provision of analytics to consumers.

Some of the types of analytic provided by the NWDAF are expected to be generated based on one or more machine-learning models. FIG. 1 is a schematic diagram showing this process in an example NWDAF 100. The NWDAF 100 comprises a data collection module 102, which collects data from one or more network functions 110 of the network (and/or other data sources). The collected data is passed to one or more training modules 104, which use machine-learning algorithms to generate and train respective models 106. The models 106 may be classifier models or, as in the illustration, prediction models. In particular, FIG. 1 shows a further network function 120 providing input data to one of the models 106 and receiving one or more predictions from the NWDAF 100 based on the input data.

An NWDAF such as the NWDAF 100 may thus be used to train one or more models using data collated from one or more network functions 110. However, collating these data at a single NWDAF can be slow and resource intensive, which may be problematic for time-critical applications. In addition, some applications require the use of data comprising sensitive or private data and collating these data at a single NWDAF may have security implications.

SUMMARY

A single instance or multiple instances of NWDAFs may be deployed in a network (e.g., a public land mobile network, PLMN). For example, different NWDAF instances may have access to different sets of data for developing one or more models for performing data analytics. In another example, an NWDAF may collate data from one or more other NWDAFs in the network and use the collated data for training a model using machine-learning. However, as noted above, collating data at a single network entity can be slow and resource intensive, and may have security implications.

Embodiments of the present disclosure seek to address these and other problems.

In one aspect, a method performed by a central NWDAF in a communications network is provided. The communications network further comprises one or more local NWDAFs configured to develop a model using federated learning, in which each local NWDAF stores a copy of the model and trains the copy of the model by inputting training data into a machine-learning process. The method comprises receiving, from the one or more local NWDAFs, a respective local model update comprising an update to values of one or more parameters of the model generated by training a respective copy of the model using machine-learning, and combining the local model updates received from the one or more local NWDAFs to obtain a combined model update.

In a further aspect, the disclosure provides an NWDAF to perform the method recited above. A further aspect provides a computer program for performing the method recited above. A computer program product, comprising the computer program, is also provided.

Another aspect provides a central NWDAF for a communications network, in which the communications network comprises one or more local NWDAFs configured to develop a model using federated learning, wherein each local NWDAF stores a copy of the model and trains the copy of the model by inputting training data into a machine-learning process. The central NWDAF comprises processing circuitry and a non-transitory machine-readable medium storing instructions which, when executed by the processing circuitry, cause the central NWDAF to: receive, from the one or more local NWDAFs, a respective local model update comprising an update to values of one or more parameters of the model generated by training a respective copy of the model using machine-learning, and combine the local model updates received from the one or more local NWDAFs to obtain a combined model update.

In another aspect, a method performed by a first local NWDAF in a communications network is provided. The method comprises inputting training data into a machine-learning process to train a model to obtain a local model update, in which the local model update comprises an update to values of one or more parameters of the model. The method further comprises sending the local model update to a central NWDAF in the communications network.

In a further aspect, the disclosure provides an NWDAF to perform the method recited above. A further aspect provides a computer program for performing the method recited above. A computer program product, comprising the computer program, is also provided.

Another aspect provides a first local NWDAF in a communications network. The local NWDAF comprises processing circuitry and a non-transitory machine-readable medium storing instructions which, when executed by the processing circuitry, cause the local NWDAF to input training data into a machine-learning process to train a model to obtain a local model update, in which the local model update comprises an update to values of one or more parameters of the model. The local NWDAF is further caused to send the local model update to a central NWDAF in the communications network.

In another aspect, a method performed by a Network Repository Function (NRF) in a communications network is provided. The method comprises receiving a request, from a first NWDAF in the communications network, to identify an NWDAF in the communications network capable of performing federated learning, the request indicating a model to be developed using federated learning; and sending, to the first NWDAF, identifying information for a second NWDAF in the communications network capable of performing federated learning to develop the model.

In a further aspect, the disclosure provides an NRF to perform the method recited above. A further aspect provides a computer program for performing the method recited above. A computer program product, comprising the computer program, is also provided.

Another aspect provides an NRF in a communications network. The NRF comprises processing circuitry and a non-transitory machine-readable medium storing instructions which, when executed by the processing circuitry, cause the NRF to receive a request, from a first NWDAF in the communications network, to identify an NWDAF in the communications network capable of performing federated learning, the request indicating a model to be developed using federated learning. The NRF is further caused to send, to the first NWDAF, identifying information for a second NWDAF in the communications network capable of performing federated learning to develop the model.

Embodiments of the disclosure thus enable using data from multiple NWDAFs in a communications network to train a model using machine-learning, whilst reducing or minimising resource overhead and reducing security risks.

BRIEF DESCRIPTION OF THE DRAWINGS

For a better understanding of examples of the present disclosure, and to show more clearly how the examples may be carried into effect, reference will now be made, by way of example only, to the following drawings in which:

FIG. 8 is a flowchart of a method performed by a Network Repository Function (NRF) according to embodiments of the disclosure;

DETAILED DESCRIPTION

Figure 1:
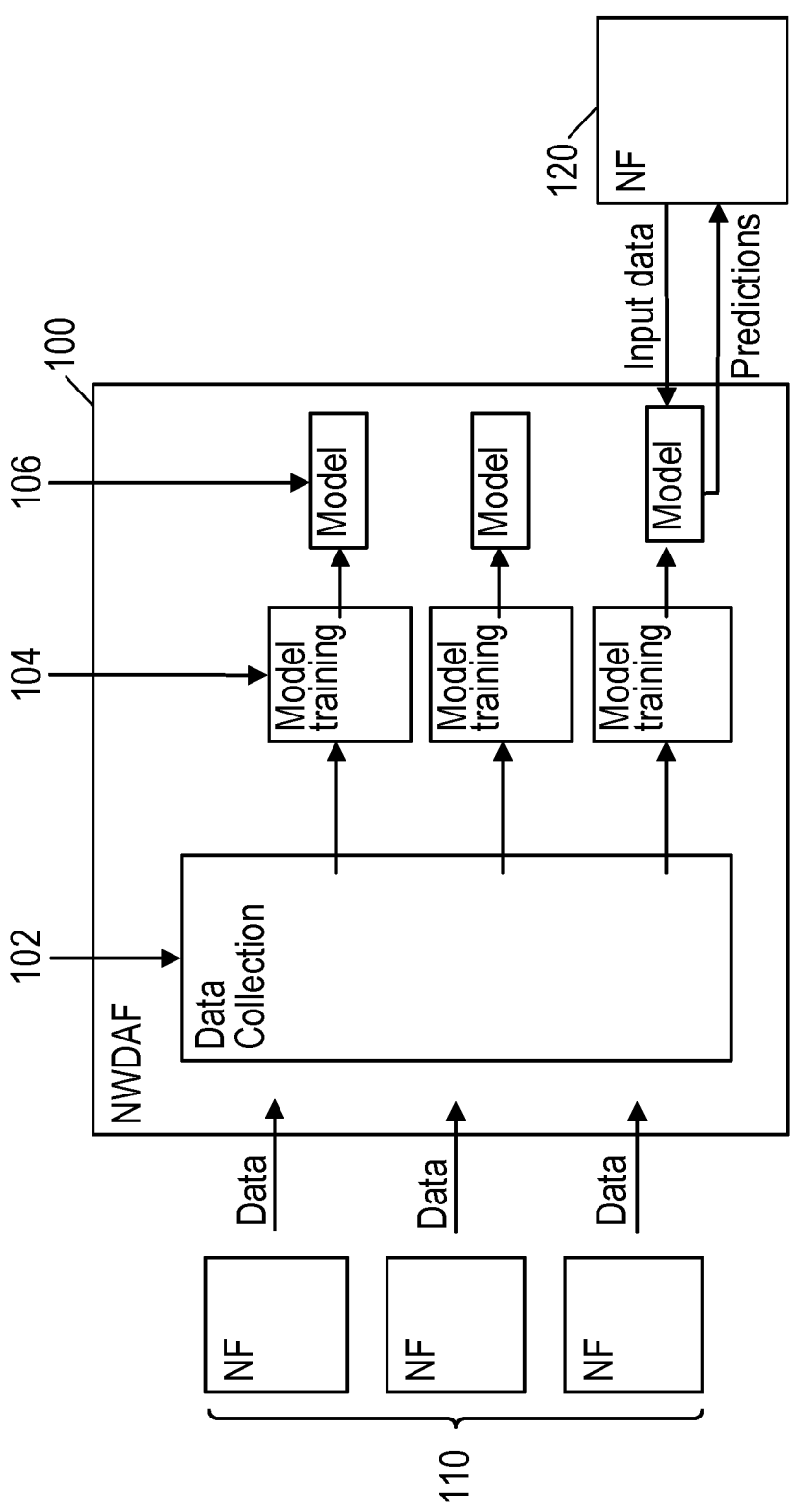
FIG. 1 shows an example of an NWDAF.
Figure 2:
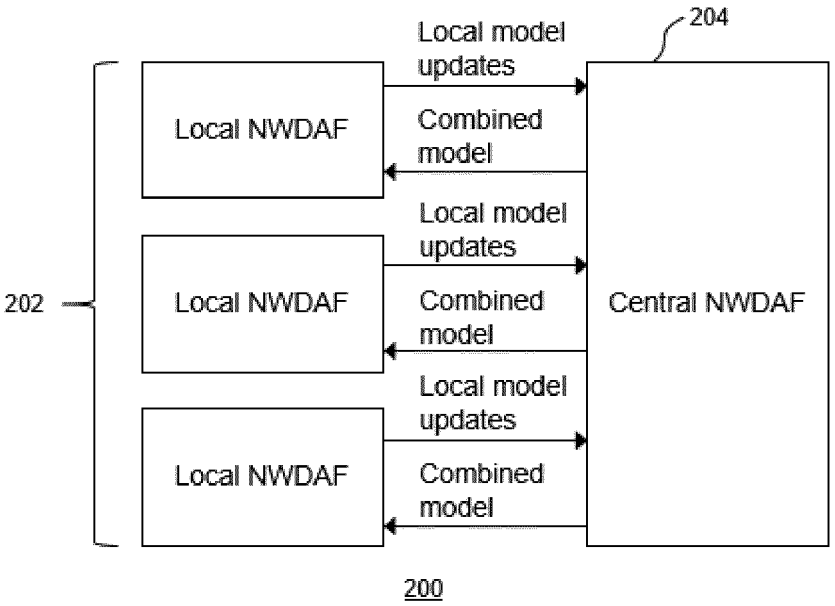
FIG. 2 shows an example of a system according to embodiments of the disclosure.

FIG. 2 is a schematic diagram of a system 200 in a communications network according to embodiments of the disclosure.

One or more entities of the system 200 may, for example, form part of a core network in the communications network. The core network may be a Fifth Generation (5G) Core Network (5GC). The communications network may implement any suitable communications protocol or technology, such as Global System for Mobile communication (GSM), Wideband Code-Division Multiple Access (WCDMA), Long Term Evolution (LTE), New Radio (NR), WiFi, WiMAX, or Bluetooth wireless technologies. In one particular example, the network forms part of a cellular telecommunications network, such as the type developed by the 3$^{rd}$ Generation Partnership Project (3GPP). Those skilled in the art will appreciate that the system 200 may comprise further components that are omitted from FIG. 2 for the purposes of clarity.

The system 200 comprises a plurality of NWDAFs 202, 204. As described above, NWDAFs are often used to provide data analytics by inputting data obtained at the NWDAF into one or more models. These models may be trained by inputting data collated by one or more NWDAFs into a machine-learning process to obtain updates to the model. Thus, parameters of a model may be refined by iteratively updating the model as data is collected in a communications network. One approach for training these models involves collating data from a plurality of NWDAFs in a network at one central NWDAF. However, collating large datasets at a single network entity may have security implications and may increase overhead signalling in the network.

Embodiments of the disclosure address these and other problems.

In one aspect, a federated (e.g. collaborative) learning process is used to train a model using machine-learning. Rather than collating data for training the model at a single NWDAF, instances of the model are trained locally at one or more NWDAFs (referred to as local NWDAFs) to obtain updates to parameters of the model at each local NWDAF. The local model updates are collated at a central NWDAF (e.g. an NWDAF that aggregates model updates) and combined to obtain a combined model update. In this way, data from multiple NWDAFs in a communications network may be used to train a model using machine-learning, whilst minimising resource overhead and reducing security risks.

Accordingly, in the system 200 illustrated in FIG. 2, the plurality of NWDAFs 202, 204 comprise a central NWDAF 204 and three local NWDAFs 202. Although three local NWDAFs 202 are shown, the skilled person will appreciate that the system 200 may in general comprise one or more local NWDAFs 202. The local NWDAFs 202 are configured to develop a model using federated learning. Each local NWDAF 202 stores a local copy of a model and trains its local copy of the model by inputting training data into a machine-learning process, thereby obtaining a local model update. The central NWDAF 204 receives local model updates from at least one of the local NWDAFs 202 and combines the local model updates to obtain a combined model update. The central NWDAF 204 may transmit the combined model update to one or more of the local NWDAFs 202. The local NWDAFs may, for example, update their respective local copies of the model using the combined model update received from the central NWDAF 204.

In order to initiate federated learning using local and central NWDAFs in a communications network, methods, apparatus and machine-readable media may be used to identify NWDAFs that are capable of performing federated learning as outlined above. Signalling procedures for registering NWDAFs, discovering NWDAFs and performing federated learning are described in more detail in respect of FIGS. 3-5.

Figure 3:
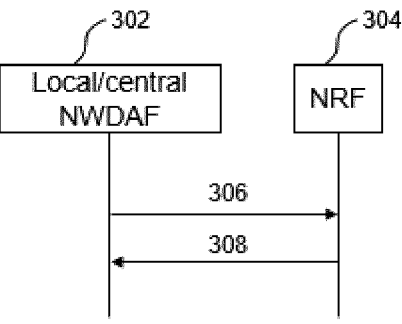
FIGS. 3-5 are signaling diagrams showing signaling according to embodiments of the disclosure.

FIG. 3 is a schematic signalling diagram for a registration procedure for an NWDAF 302 in a communications network. The NWDAF 302 may be a local NWDAF, such as any of the local NWDAFs 202 described above in respect of FIG. 2, for example. Alternatively, the NWDAF 302 may be a central NWDAF such as, for example, the central NWDAF 204 described above in respect of FIG. 2. Thus, the NWDAF 302 may be able to train a model using a machine-learning process to obtain a model update, and send the model update to a central NWDAF. Alternatively, the NWDAF 302 may be able to combine model updates received from one or more local NWDAFs.

The procedure begins with the NWDAF 302 transmitting an NF registration message 306 to a Network Repository Function (NRF) 304 in the communications network. Alternatively worded according to the service-based architecture of the 5GC, the NWDAF 302 invokes an NF registration service (Nnrf_NFRegister) in the NRF 304.

The registration message 306 comprises an indication that the NWDAF 302 is capable of performing federated learning. The skilled person will appreciate that federated learning is a process involving multiple network entities. Thus, in this context being capable of performing federated learning may be understood to refer to being capable of, for example, participating in a federated learning process. For example, both a local NWDAF capable of inputting training data into a machine-learning process to obtain a model update, and a central NWDAF that is capable of receiving and combining local model updates may be considered to be capable of performing federated learning.

The registration message 306 may further comprise an indication of whether the NWDAF 302 is a local NWDAF or a central NWDAF. The registration message 306 may thus indicate whether the NWDAF 302 is suitable for generating local model updates (by inputting data into a machine-learning process) or combining local model updates.

The registration message 306 may further comprise a model profile for one or more models supported by the NWDAF 302. The model profile comprises an identifier for the model and one or more of the following: an indication of one or more analytics produced by the model, an indication of the machine-learning process (e.g. algorithm) used to train the model, metadata (e.g. parameters) for the machine-learning process used to train the model (e.g. a number of layers in a neural network, a number of neurons per layer etc.), input parameters to the model and information relating to a dataset that is to be used for training the model using machine-learning.

Thus, for example, if the NWDAF 302 is a local NWDAF, then the information relating to a dataset for training a model using machine-learning may comprise one or more of: an identifier for the dataset; the number of samples in the dataset; and information on the parameters of the dataset. The information on the parameters of the dataset may comprise an indication of which parameters are included in the dataset (e.g., one or more identifiers for the parameters) as well as statistical information for the parameters, e.g., average values (mean, median, etc.), maximum and/or minimum values, percentiles, variance, proportion of null or void values, etc. The indication of the dataset may further comprise time information for the dataset, e.g., an indication of the time window in which the data was collected, an average time for the data, variance of the time, whether or not the data samples include timestamps, etc.

The NRF 304 acknowledges the registration of the service provided by the NWDAF 302 by transmitting an acknowledgement message 308 to the NWDAF 302. The NRF 304 may, for example, store the information received in the registration message 306 in a profile for the NWDAF 302 at the NRF 304.

The registration procedure described above may be performed when, for example, at least one of the NWDAF 302 and the NRF 304 are initially deployed in the communications network. In another example, the registration procedure may be performed for a local NWDAF when the local NWDAF generates a new model update. In a further example, the registration procedure may be performed when a functionality of an NWDAF changes (e.g. if the NWDAF instance is updated or reconfigured).

In embodiments in which the registration procedure is performed for an NWDAF 302 that has previously registered at the NRF (e.g. the registration procedure is being repeated), the registration message 306 may further comprise an identifier for the NWDAF 302. The NRF 304 may use the identifier to identify an existing record for the NWDAF 302 at the NRF 304 and may update the existing record with the information comprised in the registration message 306.

In another example in which the NWDAF 302 has previously registered at the NRF 304, one or more of the indication that the NWDAF is capable of performing federated learning and the indication of whether the NWDAF is a local NWDAF or a central NWDAF may be omitted from the registration message 306, as this information may have been provided to the NRF 304 in a previous registration process (e.g. in an earlier registration message). The registration message 306 may comprise a model profile to indicate, for example, that a model update has been generated at the NWDAF 302.

Aspects of the disclosure further provide a model removal procedure (not illustrated) for deleting an association between an NWDAF and a model at an NRF. The procedure may be applied to, for example, the NWDAF 302 and/or the NRF 304 described above in respect of FIG. 3. In the model removal procedure, the NWDAF 302 transmits a model update message (e.g. a model removal message) to the NRF 304. Alternatively worded according to the service-based architecture of the 5GC, the NWDAF 302 invokes an NF update service (Nnrf_NFUpdate) in the NRF 304. The model update message includes an identifier for the NWDAF and an indication that a model removal operation is being initiated. Thus, for example, the message may comprise an indicator that the message is a model removal message. The message further comprises an identifier for the model to be removed.

The NRF 304 sends a response to the NWDAF 302 acknowledging the message. The NRF 304 may remove (e.g. delete) the model and/or a profile for the model from a record at the NRF 304 that is associated with the NWDAF 302. For example, the NWDAF 302 may store information indicating that the NWDAF 302 is capable of performing federated learning for a particular model. In response to receiving the model removal message, the NRF 304 may delete this information. The NRF 304 may indicate, to the NWDAF 302 (e.g. in the response message) that this information has been deleted.

Aspects of the disclosure thus provide methods for registering an NWDAF at an NRF and deleting an association between an NWDAF and a model at an NRF.

Figure 4:
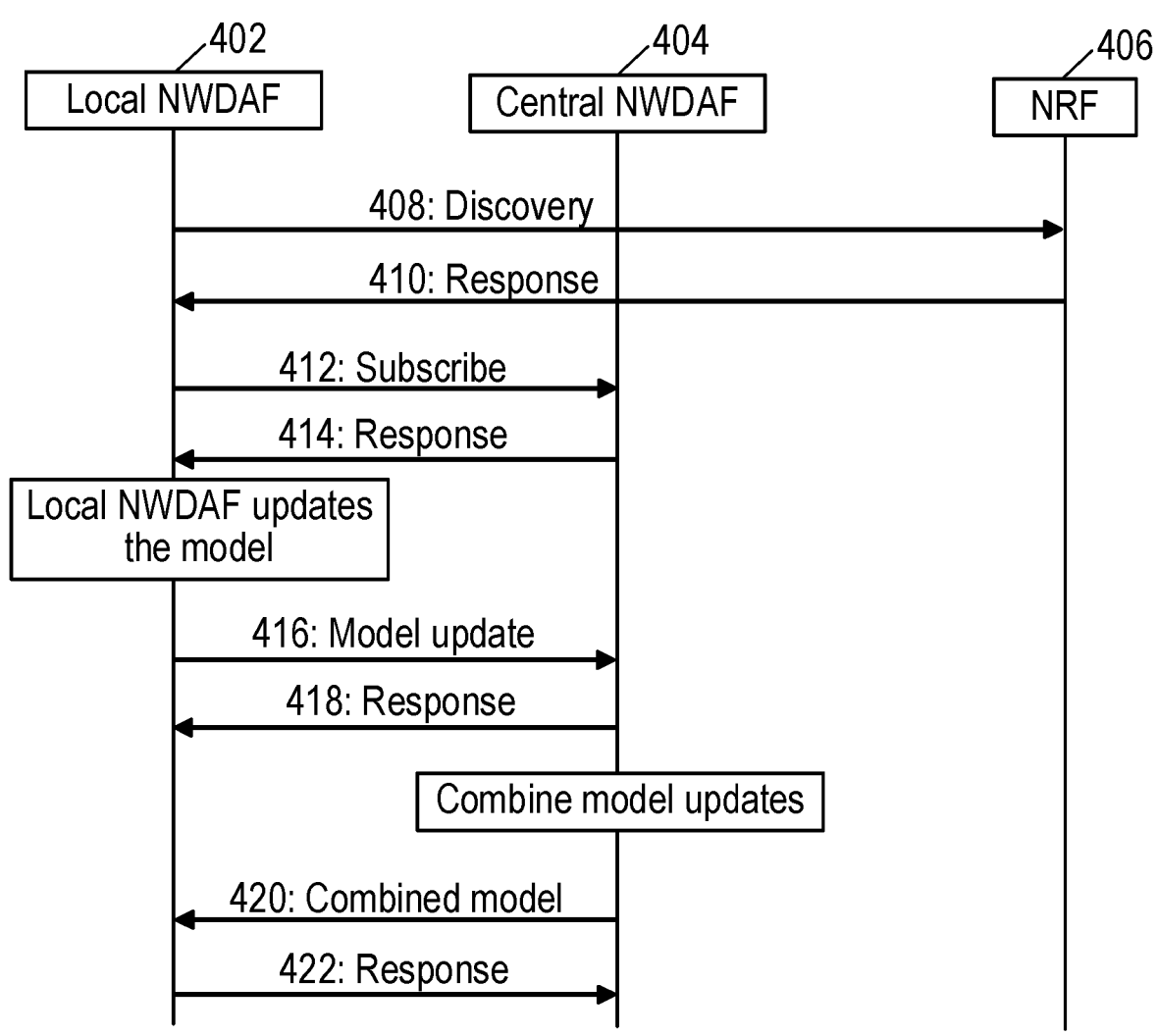

FIG. 4 is a schematic signalling diagram in a communications network according to embodiments of the disclosure. The communications network may be, for example, the communications network described above in respect of FIG. 2.

The signalling procedure enables federated learning to be performed at one or more local NWDAFs 402 and a central NWDAF 404 in the communications network to develop a model using a machine-learning process. Although only one local NWDAF 402 is shown, the skilled person will appreciate that the signalling procedure may in general involve the central NWDAF 404 and one or more local NWDAFs 402. The local NWDAF 402 may be, for example, one of the local NWDAFs 202 described above in respect of FIG. 2, for example. The central NWDAF 404 may be, for example, the central NWDAF 204 described above in respect of FIG. 2.

The signalling procedure begins with the local NWDAF 402 sending a discovery message 408 to an NRF 406 in the communications network. Alternatively worded according to the service-based architecture of the 5GC, the NWDAF 402 invokes an NF discovery service (Nnrf_NFDiscovery) in the NRF 406. The NRF 406 may be the NRF 304 described above in respect of FIG. 3. Thus, for example, one or both of the local NWDAF 402 and the central NWDAF 404 may have performed some or all of the registration procedure described above in respect of FIG. 3 to register at the NRF 406.

In sending the discovery message 408, the local NWDAF 402 requests identifying information for a central NWDAF in the communications network. The discovery message 408 thus indicates that the local NWDAF 402 wants to discover an NWDAF that is capable of combining local model updates received from other NWDAFs in the network.

The discovery message 408 indicates the model that is to be developed using federated learning. The discovery message 408 may thus comprise an identifier for the model (e.g. a model name, unique identifier or a model profile as described above). The model may be identified by, for example, an analytic produced by the model. The model may thus be identified by the analysis that it is to be used for or by one or more of its outputs, for example.

The discovery message 408 may comprise an indication of one or more inputs (e.g. input parameters) for the model. The discovery message 408 may provide information relating to the machine-learning process that is to be used to develop the model. For example, the discovery message 408 may indicate a type of machine-learning process that is to be used to train the model (e.g. a neural network, a decision tree or any other suitable machine-learning process). The discovery message 408 may additionally indicate one or more parameters of the machine-learning process. For example, if a neural network is to be used to train the model, then the discovery message 408 may indicate a number of layers in the network and/or a number of neurons per layer. The skilled person will appreciate that the information provided may be specific to the type of machine-learning process that is to be used.

The discovery message 408 may specify that the local NWDAF 402 is requesting identifying information for a central (e.g. rather than local) NWDAF. In an alternative example, the local NWDAF 402 may already be registered as a local (rather than central) NWDAF at the NRF 406. The NRF 406 may determine that the NWDAF 402 is a local NWDAF (e.g. the NWDAF 402 is capable of training the model) and assume that the local NWDAF 402 is seeking a central NWDAF (to send model updates for combining with model updates received from other NWDAFs in the network).

Based on the information comprised in the discovery message 408, the NRF 406 identifies a central NWDAF in the communications network that is capable of performing federated learning to develop the model. Thus, for example, the NRF 406 may determine which of a plurality of NWDAFs that are registered at the NRF 406 are central NWDAFs. The NRF 406 may additionally determine which of the plurality of NWDAFs are capable of performing federated learning for the particular model identified in the discovery message 408.

The NRF 406 sends a response message 410 to the local NWDAF 402 identifying the central NWDAF 404 to the local NWDAF 402. The identifying information for the central NWDAF 404 may comprise any suitable identifier (e.g. a name, a unique identifier, an address or location in the network etc.). The NRF 406 may have obtained the identifying information for the NWDAF 404 as part of the registration procedure described above in respect of FIG. 3, for example.

The local NWDAF 402 sends a subscription message 412 to the NWDAF that was identified in the response message 410 from the NRF 406. Thus, as illustrated, the local NWDAF 402 sends a subscription message 412 to the central NWDAF 404. Alternatively worded according to the service-based architecture of the 5GC, the NWDAF 402 invokes a Subscribe service operation (Nnwdaf_ModelUpgrade) in the central NWDAF 404.

The subscription message 412 may indicate to the central NWDAF 404 that the local NWDAF 402 wishes to perform federated learning to develop the model using machine-learning. The subscription message may thus, for example, request that the central NWDAF 404 participates in the federated learning procedure. The central NWDAF 404 may understand from the subscription message 412 that the local NWDAF 402 is to send one or more local model updates (determined at the local NWDAF 402) to the central NWDAF 404.

The subscription message 412 comprises an identifier for the local NWDAF 402. The identifier may take any suitable form (e.g. a unique name or code, an address or location in the network etc.). The subscription message 412 further indicates the model that is to be developed using federated learning. The model may be identified using any suitable identifier (e.g. using any of the model identifiers described above in respect of the discovery message 408).

The subscription message 412 may further comprise one or more first update conditions for receiving a combined model update from the central NWDAF 404. That is, the subscription message 412 may specify one or more first update conditions which, when satisfied, trigger the central NWDAF 404 to send a combined model update to the local NWDAF 402.

The first update conditions may comprise a threshold accuracy of the model at the central NWDAF 404. The central NWDAF 404 may assess the accuracy of any combined models calculated at the central NWDAF 404 (e.g. by inputting test data into the combined model) and only send a combined model update to the local NWDAF 402 when the model is deemed to have reached a particular level of accuracy.

The first update conditions may, additionally or alternatively, comprise an indication of a time at which the local NWDAF 402 is to receive a combined model update. For example, the first update conditions may specify a time interval between sending combined model updates from the central NWDAF 404 to the local NWDAF 402. Alternatively, the first update conditions may specify a particular time at which the central NWDAF 404 is to send a combined model update (e.g. an absolute time rather than a relative time between messages).

The first update conditions may, additionally or alternatively, comprise a threshold change (e.g. a minimum change) in one or more parameters of the model at the central NWDAF 404 (e.g. compared the last version of the model). The threshold change may be specific to a particular parameter of the model (e.g. each parameter may be associated with a respective threshold change). Alternatively, the threshold change may be generic to any of the parameters of the model. For example, the first update conditions may specify that the central NWDAF 404 is to send a combined model update if any of the parameters change by more than 10% relative to a previous iteration of the model. The central NWDAF 404 may store parameters of the model each time a combined model update is obtained, so that it may monitor variations in model parameters over time.

The skilled person will appreciate that the aforementioned first update conditions are exemplary, and the one or more first update conditions may comprise any suitable conditions for receiving combined model updates from the central NWDAF 404. In particular examples, the subscription message 412 may specify how many of the one or more first update conditions must be satisfied to trigger the central NWDAF 404 to send a combined model update. In one example, the subscription message 412 may specify that the central NWDAF 404 is to send a combined model update if at least one of the first update conditions are satisfied. In an alternative example, the central NWDAF 404 may send a combined model update only if all of the first update conditions are met.

The central NWDAF 404 may send a response 414 to the local NWDAF 402 acknowledging the subscription message 412. The response may comprise a copy of the model that the local NWDAF 402 is to train. The model may be specified using, for example, the parameters of the model, a model binary, a model formula or any other format suitable for defining the model. The copy of the model may be, for example, a most recent version of the model obtained at the central NWDAF 404 using a federated learning process involving one or more other NWDAFs in the communications network.

The response 414 may, additionally or alternatively, comprise one or more second update conditions which, when satisfied, trigger the local NWDAF 402 to send a local model update to the central NWDAF 404. The skilled person will appreciate that the one or more second update conditions may be substantially similar to the first update conditions described above, as applied to local model updates determined at the NWDAF.

Thus, for example, the one or more second update conditions may comprise one or more of: a threshold accuracy of the model at the local NWDAF, an indication of a time at which the local NWDAF 402 is to send a local model update (e.g. a time interval between transmissions of local model updates by the local NWDAF) and a threshold change in one or more parameters of the model at the local NWDAF.

In particular embodiments, the one or more second update conditions, which specify when a local NWDAF 402 sends a local model update to the central NWDAF, may be specific to the local NWDAF. For example, a local NWDAF which has access to a larger set of training data (e.g. if it acquires training data from a greater number of network functions) may be requested to send local model updates more frequently than another local NWDAF that has access to a smaller set of training data. Alternatively, the central NWDAF 404 may send the same update conditions to any local NWDAFs that are performing federated learning to develop the model.

The local NWDAF 402 inputs training data into a machine-learning process to train a model to obtain a local model update. The local NWDAF 402 may, for example, train the model in response to receiving the response 414 to the subscription request 412.

The training data may comprise, for example, data that is measured by the local NWDAF 402. Additionally or alternatively, the training data may comprise data collated by the local NWDAF 402 from one or more network entities in the communications network. In either case, the training data may be data that is specific to the local NWDAF 402. For example, the training data may be data that the local NWDAF 402 has access to, but the central NWDAF 404 does not.

The local model update comprises an update to values of one or more parameters of the model. The local model update may be the updated parameters of the model (or all parameters of the model) or the local model update may be, for example, an indication of a change in the model parameters.

The local NWDAF 402 sends the local model update to the central NWDAF in an update message 416. If no update conditions were specified in the response message 414, then the local NWDAF 402 may send the local model update immediately after it is calculated.

Alternatively, the local NWDAF 402 may send the local model update in response to determining that the second update conditions are satisfied. In particular examples, the local NWDAF 402 may only send the local model update if all of the second update conditions are satisfied. In an alternative example, the local NWDAF 402 may send the local model update if any of the second update conditions are satisfied. For example, the local NWDAF 402 may determine that the parameters of the updated model differ from its original local copy of the model (e.g. a copy of the model received from the central NWDAF 404) by more than a threshold amount specified in the second update conditions, and may thus send the local model update to the central NWDAF 404.

The central NWDAF 404 receives the local model update from the local NWDAF 402. As described above, although the signalling procedure in FIG. 4 is described in respect of single local NWDAF 402, the procedure may in general be performed in respect of one or more local NWDAFs in the communications network. Thus the central NWDAF 404 may, in general, receive local model updates from one or more local NWDAFs 402 in the communications network. The central NWDAF 404 combines the local model updates to obtain a combined model update. The central NWDAF 404 may combine the local model updates in any suitable manner (e.g. by taking an average of the local model updates).

In particular embodiments, the central NWDAF 404 may also act as a local NWDAF. That is, the central NWDAF 404 may, using data obtained at the central NWDAF 404, input the data into a machine-learning process to determine its respective local model update. The central NWDAF 404 may combine its own local model update with local model updates received from one or more local NWDAFs (e.g. the NWDAF 402) in the communications network to obtain the combined model update.

The skilled person will appreciate that the central NWDAF may receive local model updates from different local NWDAFs at different times. In some embodiments, the central NWDAF 404 may delay determining the combined model update until a threshold number of local model updates are obtained (e.g. received) at the central NWDAF 404. For example, the central NWDAF 404 may only combine local model updates once a respective local model update is received from each of the local NWDAFs which have subscribed to perform federated learning for the model. In another example, the central NWDAF 404 may combine the local model updates in response to obtaining two or local model updates (e.g. a local model update calculated by the central NWDAF 404 and a local model update received from a local NWDAF such as the local NWDAF 402).

The central NWDAF 404 may combine local model updates received at different times in stages. For example, the central NWDAF 404 may obtain first, second and third model updates from first, second and third local NWDAFs respectively, in which the first and second model update are received prior to the third model update. The central NWDAF 404 may thus, for example, combine the first and second model local updates to obtain an initial combined model update which is stored at the central NWDAF 404. Upon receipt of the third model update, the central NWDAF 404 may combine the initial combined model update with the third model update to obtain a final model update that is to be distributed to one or more of the first, second and third local NWDAFs.

Thus, the central NWDAF 404 combines local model updates received from one or more local NWDAFs (e.g. including the local NWDAF 402) in the communications network to obtain a combined model update.

As illustrated, the central NWDAF 404 sends the combined model update to the local NWDAF 402 in an update message 420. In general, the skilled person will appreciate that the NWDAF 402 may send the combined model update to the one or more local NWDAFs that are performing federated learning. For example, the central NWDAF 404 may send the combined model update to any local NWDAFs that sent a local model update to the central NWDAF 404. In another example, the central NWDAF 404 may send the combined model update to local NWDAFs that are subscribed to receive model updates from the central NWDAF 404 (e.g. local NWDAFs that have requested to receive combined model updates from the central NWDAF 404).

Similar to the local model update 416 transmitted by the local NWDAF 402, the combined model update 420 comprises an update to values of one or more parameters of the model. The combined model update may be the updated parameters of the model (or all parameters of the model) or the combined model update may be, for example, an indication of a change in the model parameters.

The central NWDAF 404 may send the combine model update when it is calculated (e.g. if no first update conditions were specified in the subscription message 412). Alternatively, in particular embodiments, the central NWDAF 404 only sends the combined model update when at least one of the one or more first update conditions are satisfied. Thus, for example, the central NWDAF 404 may only send the combined model update to the local NWDAF 402 if the central NWDAF 404 determines that the combined model update satisfies an accuracy requirement (e.g. it satisfies an accuracy threshold). The central NWDAF 404 may send the combined model update if at least one of the first update conditions are satisfied. Alternatively, the central NWDAF 404 may only send the combined model update if each (all) of the first update conditions are satisfied.

The local NWDAF 402 receives the combined model update from the central NWDAF 404. The local NWDAF 402 may update its local copy of the model using the combined model update. Thus, for example, if the combined model update indicates a change in one or more parameters of the model, then the local NWDAF 402 may change the parameters of the model by the amount(s) specified in the update message 420.

The local NWDAF 402 may send a response message 422 to the central NWDAF 404 acknowledging receipt of the combined model update.

The local NWDAF 402 may use the updated local copy of the model (e.g. the copy of the model updated using the combined model update) for subsequent development of the model. The skilled person will thus appreciate that parts of the signalling procedure described in respect of FIG. 4 may be iterative, so that the local NWDAF 402 obtains a combined model update from the central NWDAF 404, trains the updated model using data obtained at the local NWDAF 402 and sends a local model update to the central NWDAF 404 to enable the central NWDAF 404 to determine a further combined model update.

Aspects of the disclosure thus provide methods for developing a model using machine-learning in which the training of the model can be distributed across multiple NWDAFs in a communications network.

Figure 5:
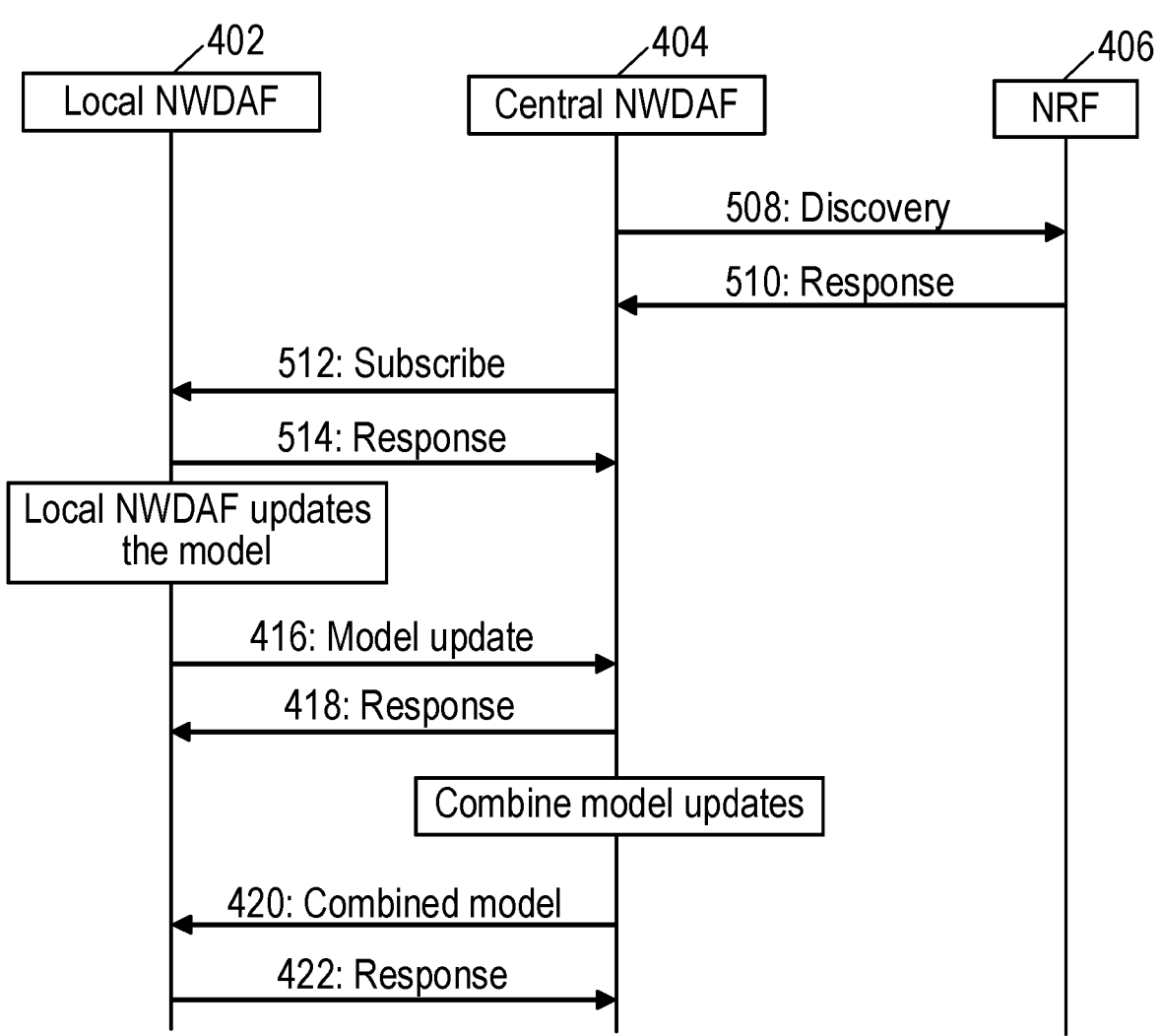

FIG. 5 is a schematic signalling diagram in a communications network according to embodiments of the disclosure. Messages 416-422 are substantially the same as those described above in respect of FIG. 4. However, FIG. 5 shows an alternative approach for discovery (messages 408 and 410 in FIG. 4) and subscription (messages 412 and 414 in FIG. 4) according to embodiments of the disclosure. Accordingly, the description of messages 416-422 will not be repeated again here, and the skilled person will appreciate that the description accompanying these messages in respect of FIG. 4 applies to FIG. 5.

In contrast to FIG. 4, the signaling procedure illustrated in FIG. 5 enables the central NWDAF 404 to discover the local NWDAF 402. Thus, the central NWDAF 404 may initiate a discovery process with the NRF 406 to identify one or more local NWDAFs in the communications network that are capable of performing federated learning to develop a model using a machine-learning process.

The procedure starts with the central NWDAF 404 sending a discovery message 508 to the NRF 406. Alternatively worded according to the service-based architecture of the 5GC, the central NWDAF 404 invokes an NF discovery service (Nnrf_NFDiscovery) in the NRF 406. In sending the discovery message 508, the local NWDAF 402 requests identifying information for one or more local NWDAFs in the communications network that are capable of performing federated learning to develop a model.

The discovery message 508 may be substantially similar to the discovery message 408 described above in respect of FIG. 4, except that it indicates that the NRF 406 is to identify one or more local NWDAFs, rather than a central NWDAF. As described above in respect of FIG. 4, this may be explicit in the discovery message 508 (e.g. the discovery message may specify that the central NWDAF 404 is requesting identifying information for one or more local NWDAFs) or implicit (e.g. the NRF 406 may determine that the central NWDAF 404 is a central, rather than local, NWDAF and assume that local NWDAFs are sought).

The discovery message 508 indicates a model to be developed using federated learning, as described above in respect of discovery message 408. The discovery message 508 may also indicate one or more inputs to the model and/or provide information relating to the machine-learning process that is to be used to develop the model. In this respect, the description of message 408 will be considered to apply to message 508.

The NRF 406 determines one or more local NWDAFs that are capable of performing federated learning to develop the model based on the information comprised in the discovery message 508. The NRF 406 sends a response message 510 to the central NWDAF 404 identifying the one or more local NWDAFs. The identifying information for the one or more local NWDAFs may comprise any suitable identifier (e.g. a name, a unique identifier, an address or location in the network etc.). The NRF 406 may have obtained the identifying information for the local NWDAFs as part of the registration procedure described above in respect of FIG. 3, for example. In the illustrated example, the response message 510 comprises identifying information for the local NWDAF 402.

The central NWDAF 404 sends a subscription message 512 to the one or more local NWDAFs identified in the response message 510 from the NRF 406. Alternatively worded according to the service-based architecture of the 5GC, the central NWDAF 404 invokes a Subscribe service operation (Nnwdaf_ModelUpgrade) in the local NWDAF 402.

Thus, in the illustrated example, the central NWDAF 404 sends a subscription message 512 to the local NWDAF 402.

The subscription message 512 may indicate to the local NWDAF 402 that the central NWDAF 404 wishes to perform federated learning to develop the model using machine-learning. The subscription message 512 may thus, for example, request that the local NWDAF 402 participates in the federated learning procedure. The local NWDAF 402 may understand from the subscription message 512 that the local NWDAF 402 is to train a local copy of the model by inputting data into a machine-learning process to obtain a local model update and send the local model update to the central NWDAF 404.

The subscription message 512 comprises an identifier for the central NWDAF 404. The identifier may take any suitable form (e.g. a unique name or code, an address or location of the central NWDAF 404 in the network etc.). The subscription message 512 further indicates the model that is to be developed using federated learning. The model may be identified using any suitable identifier (e.g. using any of the model identifiers described above in respect of the discovery message 408 in FIG. 4).

The subscription message 512 may further comprise one or more of the second update conditions described above in respect of FIG. 4. That is, the subscription message 512 may specify one or more second update conditions which, when satisfied, trigger the local NWDAF 402 to send a local model update to the central NWDAF 404.

The subscription message 512 may further comprise a copy of the model that the local NWDAF 402 is to train (e.g. a local copy of the model for the local NWDAF 402). The model may be specified using, for example, the parameters of the model, a model binary, a model formula or any other format suitable for defining the model. The copy of the model may be, for example, a most recent model obtained at the central NWDAF 404 using a federated learning process involving one or more other local NWDAFs in the communications network.

The local NWDAF 402 may send a response 514 to the central NWDAF 404, acknowledging the subscription message. The response 514 may comprise the one or more first update conditions described above in respect of FIG. 4. The response 514 may thus specify one or more first update conditions which, when satisfied, trigger the central NWDAF 404 to send a combined model update to the local NWDAF 402.

The local NWDAF 402 inputs training data to a machine-learning process to train its local copy of the model. The local NWDAF 402 may train the model in response to receiving the subscription message 512, for example. The process then continues as described above with respect to FIG. 4.

Figure 6:
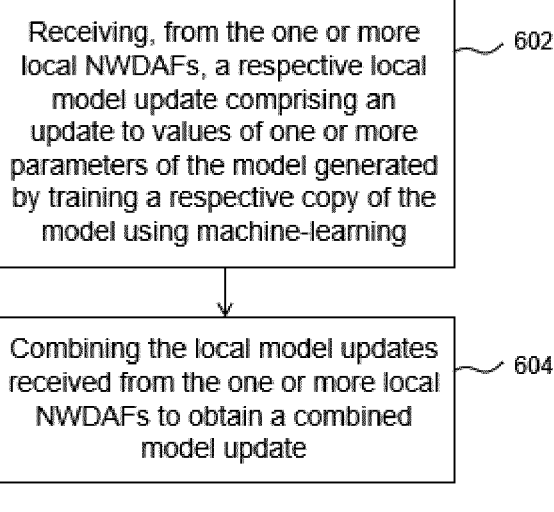
FIG. 6 is a flowchart of a method performed by a central NWDAF according to embodiments of the disclosure.

FIG. 6 is a flowchart of a method 600 performed by a central NWDAF in a communications network (e.g. the communications network described in respect of FIG. 2) according to embodiments of the disclosure. The communications network further comprises one or more local NWDAFs configured to develop a model using federated learning. Each local NWDAF is configured to store a copy of the model and train the copy of the model by inputting training data into a machine-learning process, The central NWDAF may be the central NWDAF 204 described above in respect of FIG. 2 or the central NWDAF 404 described above in respect of FIGS. 4-5, for example. The one or more local NWDAFs may be, for example, any of the local NWDAFs 202 described in respect of FIG. 2 or the local NWDAF 402 described in respect of FIGS. 4-5.

In step 602, the central NWDAF receives, from the one or more local NWDAFs, a respective local model update comprising an update to values of one or more parameters of the model generated by training a respective copy of the model using machine-learning. For example, the central NWDAF may receive the one or more local model updates in a model update message 416 as described above in respect of FIG. 4.

In step 604, the central NWDAF combines the local model updates received from the one or more local NWDAFs to obtain a combined model update. Thus, as described above in respect of FIG. 4, the central NWDAF may combine local model updates received from a plurality of local NWDAFs to obtain the combined model update. In another example, the central NWDAF combines one or more local model updates received from local NWDAFs with a local model update generated by the central NWDAF.

The central NWDAF may then send the combined model update to at least one of the one or more local NWDAFs. For example, the central NWDAF may send the combined model update to the one or more local NWDAFs in an update message 420 described above in respect of FIG. 4. The central NWDAF may, additionally or alternatively, store the combined model update (e.g. for later retrieval).

In the illustrated example, the method begins in step 602. In alternative examples, the central NWDAF may perform one or more of the registration (messages 306-308), discovery (messages 408-410 or 508-510) and subscription (messages 412-414 or 512-514) procedures described above in respect of FIGS. 3-5 before proceeding to step 602 in the method 600.

Figure 7:
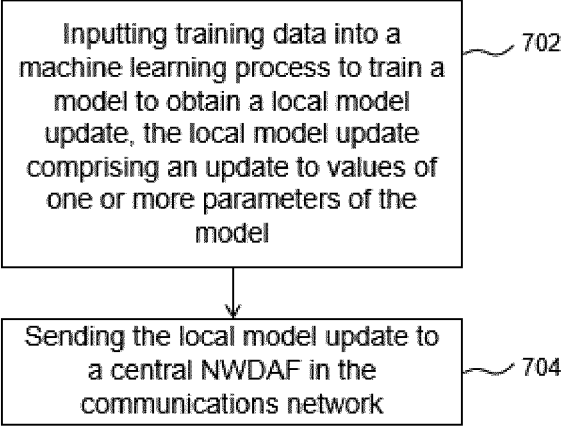
FIG. 7 is a flowchart of a method performed by a local NWDAF according to embodiments of the disclosure.

FIG. 7 is a flowchart of a method 700 performed by a local NWDAF in a communications network according to embodiments of the disclosure.

The one or more local NWDAFs may be any of the local NWDAFs 202 described in respect of FIG. 2 or the local NWDAF 402 described in respect of FIGS. 4-5, for example.

In step 702, the local NWDAF inputs training data into a machine-learning process to train a model to obtain a local model update. The local model update comprises an update to values of one or more parameters of the model. As described above, the local model update may comprise the values of parameters of the model or the local model update may, for example, comprise a change in the parameter values for the model.

In step 704, the local NWDAF sends the local model update to a central NWDAF in the communications network. The central NWDAF may be any of the central NWDAF 204 described above in respect of FIG. 2 or the central NWDAF 404 described above in respect of FIGS. 4-5, for example. For example, the local NWDAF may send the local model update to a central NWDAF in a model update message 416 described above in respect of FIG. 4.

As illustrated, the method 700 may begin in step 702. Alternatively, the local NWDAF may perform one or more of: the registration (messages 306-308), discovery (messages 408-410 or 508-510) and subscription (messages 412-414 or 512-514) procedures described above in respect of FIGS. 3-5 before proceeding to step 702. Thus, for example, in step 704 the local NWDAF may send the local model update to a central NWDAF identified in the discovery procedure described in respect of FIG. 4.

FIG. 8 is a flowchart of a method performed by an NRF in a communications network (e.g. the communications network described in respect of FIG. 2) according to embodiments of the disclosure. The NRF may be the NRF 304 described in respect of FIG. 3 or the NRF 406 described in respect of FIGS. 4-5, for example.

In step 802, the NRF receives a request, from a first NWDAF in the communications network, to identify an NWDAF in the communications network capable of performing federated learning. The request indicates a model to be developed using federated learning. Thus, for example, the request may be the discovery message 408 or the discovery message 508 described above in respect of FIGS. 4-5.

In step 804, the NRF sends, to the first NWDAF, identifying information for a second NWDAF in the communications network capable of performing federated learning to develop the model. The NRF may thus send a response message such as, for example, the response message 410 or the response message 510 described above in respect of FIGS. 4-5.

In some embodiments, the first NWDAF is a local NWDAF and the second NWDAF is a central NWDAF. Thus, for example, the first NWDAF may be a local NWDAF and the request may be to identify a central NWDAF in the communications network capable of performing federated learning by combining local model updates received from one or more local NWDAFs.

Alternatively, in some embodiments the first NWDAF is a central NWDAF and the second NWDAF is a local NWDAF. Thus, the first NWDAF may be a central NWDAF and the request may be to identify at least one local NWDAF in the communications network capable of performing federated learning by inputting training data into a machine-learning process to train a model to obtain a local model update, wherein the local model update comprises an update to values of one or more parameters of the model.

In general, at least one of the first and second NWDAF is a central NWDAF and the other of the first and second NWDAF is a local NWDAF.

In the illustrated example, the method begins in step 802. In alternative examples, the NRF may perform the registration procedure described above in respect of FIG. 3 with the first NWDAF and/or the second NWDAF prior to performing step 802.

Figure 9:
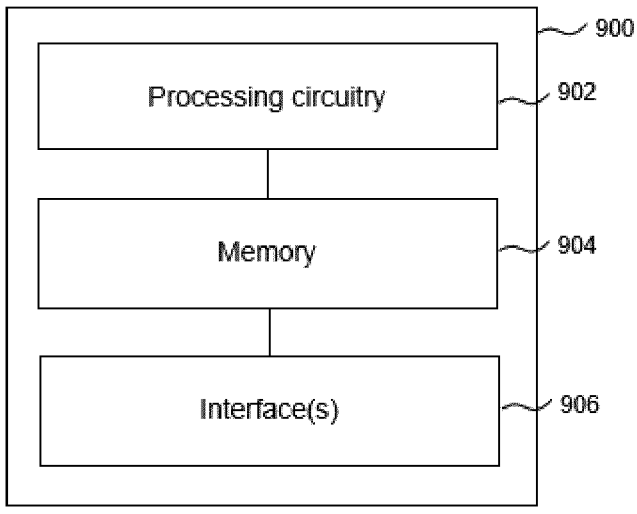
FIGS. 9 and 10 are schematic drawings of a central NWDAF according to embodiments of the disclosure.

FIG. 9 is a schematic diagram of an NWDAF 900 for a communications network (e.g. the communications network described above in respect of FIG. 2) according to embodiments of the disclosure. The communications network further comprises one or more local NWDAFs configured to develop a model using federated learning, in which each local NWDAF is configured to store a copy of the model and train the copy of the model by inputting training data into a machine-learning process.

The central NWDAF 900 may be, for example, any of: the central NWDAF 204 described above in respect of FIG. 2, the NWDAF 302 described in respect of FIG. 3 or the central NWDAF 404 described in respect of FIGS. 4 and 5. The central NWDAF 900 may be operable to carry out the example method 600 described with reference to FIG. 6 and possibly any other processes or methods disclosed herein. It is also to be understood that the method of FIG. 6 may not necessarily be carried out solely by the central NWDAF 900. At least some operations of the method can be performed by one or more other entities.

The central NWDAF 900 comprises processing circuitry 902 (such as one or more processors, digital signal processors, general purpose processing units, etc.), a machine-readable medium 904 (e.g., memory such as read-only memory (ROM), random-access memory, cache memory, flash memory devices, optical storage devices, etc.) and one or more interfaces 906.

In one embodiment, the machine-readable medium 904 stores instructions which, when executed by the processing circuitry 902, cause the central NWDAF 900 to: receive, from the one or more local NWDAFs, a respective local model update comprising an update to values of one or more parameters of the model generated by training a respective copy of the model using machine-learning. The central NWDAF 900 is further caused to combine the local model updates received from the one or more local NWDAFs to obtain a combined model update.

In other embodiments, the processing circuitry 902 may be configured to directly perform the method, or to cause the central NWDAF 900 to perform the method, without executing instructions stored in the non-transitory machine-readable medium 904, e.g., through suitably configured dedicated circuitry.

The one or more interfaces 906 may comprise hardware and/or software suitable for communicating with other nodes of the communications network using any suitable communication medium. For example, the interfaces 906 may comprise one or more wired interfaces, using optical or electrical transmission media. Such interfaces may therefore utilize optical or electrical transmitters and receivers, as well as the necessary software to encode and decode signals transmitted via the interface. In a further example, the interfaces 906 may comprise one or more wireless interfaces. Such interfaces may therefore utilize one or more antennas, baseband circuitry, etc. The components are illustrated coupled together in series; however, those skilled in the art will appreciate that the components may be coupled together in any suitable manner (e.g., via a system bus or suchlike).

In further embodiments of the disclosure, the central NWDAF 900 may comprise power circuitry (not illustrated). The power circuitry may comprise, or be coupled to, power management circuitry and is configured to supply the components of central NWDAF 900 with power for performing the functionality described herein. Power circuitry may receive power from a power source. The power source and/or power circuitry may be configured to provide power to the various components of central NWDAF 900 in a form suitable for the respective components (e.g., at a voltage and current level needed for each respective component). The power source may either be included in, or external to, the power circuitry and/or the central NWDAF 900. For example, the central NWDAF 900 may be connectable to an external power source (e.g., an electricity outlet) via an input circuitry or interface such as an electrical cable, whereby the external power source supplies power to the power circuitry. As a further example, the power source may comprise a source of power in the form of a battery or battery pack which is connected to, or integrated in, the power circuitry. The battery may provide backup power should the external power source fail. Other types of power sources, such as photovoltaic devices, may also be used.

Figure 10:
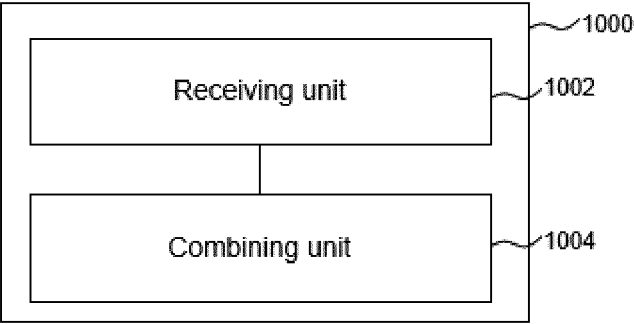

FIG. 10 is a schematic diagram of an NWDAF 1000 for a communications network (e.g. the communications network described above in respect of FIG. 2) according to embodiments of the disclosure. The communications network further comprises one or more local NWDAFs configured to develop a model using federated learning, in which each local NWDAF is configured to store a copy of the model and train the copy of the model by inputting training data into a machine-learning process.

The central NWDAF 1000 may be, for example, any of: the central NWDAF 204 described above in respect of FIG. 2, the NWDAF 302 described in respect of FIG. 3 or the central NWDAF 404 described in respect of FIGS. 4 and 5.

The central NWDAF 1000 comprises a receiving unit 1002, which is configured to receive, from the one or more local NWDAFs, a respective local model update comprising an update to values of one or more parameters of the model generated by training a respective copy of the model using machine-learning. The central NWDAF 1000 further comprises a combining unit 1004, which is configured to combine the local model updates received from the one or more local NWDAFs to obtain a combined model update. Thus, for example, the receiving unit 1002 may be configured to perform step 602 described above in respect of FIG. 6 and the combining unit 1004 may be configured to perform step 604 described above in respect of FIG. 6.

The central NWDAF 1000 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc.

Program code stored in memory includes program instructions for executing one or more telecommunications and/or data communications protocols as well as instructions for carrying out one or more of the techniques described herein, in several embodiments. In some implementations, the processing circuitry may be used to cause receiving unit 1002 and combining unit 1004, and any other suitable units of central NWDAF 1000 to perform corresponding functions according one or more embodiments of the present disclosure.

The central NWDAF 1000 may additionally comprise power-supply circuitry (not illustrated) configured to supply the central NWDAF 1000 with power.

Figure 11:
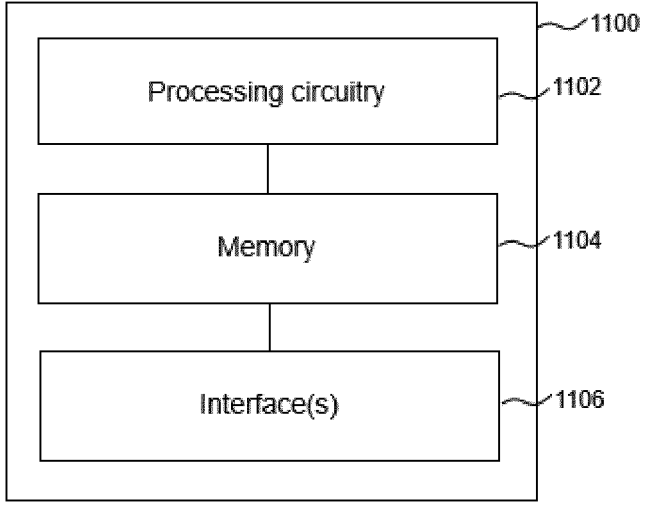
FIGS. 11 and 12 are schematic drawings of a local NWDAF according to embodiments of the disclosure.

FIG. 11 is a schematic diagram of a local NWDAF 1100 for a communications network (e.g. the communications network described above in respect of FIG. 2) according to embodiments of the disclosure. The local NWDAF 1100 may be, for example, any of: one of the local NWDAFs 202 described in respect of FIG. 2, the NWDAF 302 described in respect of FIG. 3 or the local NWDAF 402 described in respect of FIGS. 4-5.

The local NWDAF 1100 may be operable to carry out the example method described with reference to FIG. 7 and possibly any other processes or methods disclosed herein. It is also to be understood that the method of FIG. 7 may not necessarily be carried out solely by the local NWDAF 1100. At least some operations of the method can be performed by one or more other entities.

The local NWDAF 1100 comprises processing circuitry 1102 (such as one or more processors, digital signal processors, general purpose processing units, etc.), a machine-readable medium 1104 (e.g., memory such as read-only memory (ROM), random-access memory, cache memory, flash memory devices, optical storage devices, etc.) and one or more interfaces 1106.

In one embodiment, the machine-readable medium 1104 stores instructions which, when executed by the processing circuitry 1102, cause the local NWDAF 1100 to input training data into a machine-learning process to train a model to obtain a local model update. The local model update comprises an update to values of one or more parameters of the model. The local NWDAF 1100 is further caused to send the local model update to a central NWDAF in the communications network.

In other embodiments, the processing circuitry 1102 may be configured to directly perform the method, or to cause the local NWDAF 1100 to perform the method, without executing instructions stored in the non-transitory machine-readable medium 1104, e.g., through suitably configured dedicated circuitry.

The one or more interfaces 1106 may comprise hardware and/or software suitable for communicating with other nodes of the communications network using any suitable communication medium. For example, the interfaces 1106 may comprise one or more wired interfaces, using optical or electrical transmission media. Such interfaces may therefore utilize optical or electrical transmitters and receivers, as well as the necessary software to encode and decode signals transmitted via the interface. In a further example, the interfaces 1106 may comprise one or more wireless interfaces. Such interfaces may therefore utilize one or more antennas, baseband circuitry, etc. The components are illustrated coupled together in series; however, those skilled in the art will appreciate that the components may be coupled together in any suitable manner (e.g., via a system bus or suchlike).

In further embodiments of the disclosure, the local NWDAF 1100 may comprise power circuitry (not illustrated). The power circuitry may comprise, or be coupled to, power management circuitry and is configured to supply the components of local NWDAF 1100 with power for performing the functionality described herein. Power circuitry may receive power from a power source. The power source and/or power circuitry may be configured to provide power to the various components of local NWDAF 1100 in a form suitable for the respective components (e.g., at a voltage and current level needed for each respective component). The power source may either be included in, or external to, the power circuitry and/or the local NWDAF 1100. For example, the local NWDAF 1100 may be connectable to an external power source (e.g., an electricity outlet) via an input circuitry or interface such as an electrical cable, whereby the external power source supplies power to the power circuitry. As a further example, the power source may comprise a source of power in the form of a battery or battery pack which is connected to, or integrated in, the power circuitry. The battery may provide backup power should the external power source fail. Other types of power sources, such as photovoltaic devices, may also be used.

Figure 12:
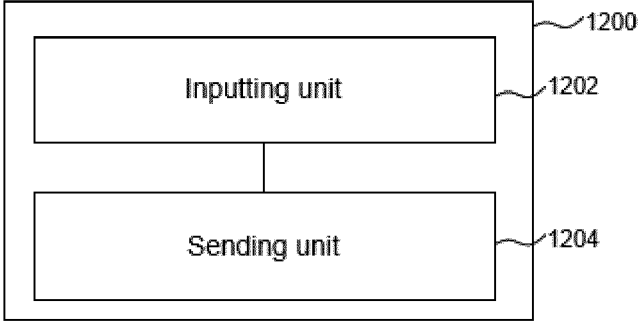

FIG. 12 is a schematic diagram of a local NWDAF 1200 for a communications network (e.g. the communications network described above in respect of FIG. 2) according to embodiments of the disclosure The local NWDAF 1200 may be, for example, any of: one of the local NWDAFs 202 described in respect of FIG. 2, the NWDAF 302 described in respect of FIG. 3 or the local NWDAF 402 described in respect of FIGS. 4-5. At least some operations of the method can be performed by one or more other entities.

The local NWDAF 1200 comprises an inputting unit 1202, which is configured to input training data into a machine-learning process to train a model to obtain a local model update. The local model update comprises an update to values of one or more parameters of the model. The local NWDAF 1200 further comprises a sending unit 1204, which is configured to send the local model update to a central NWDAF in the communications network. Thus, for example, the inputting unit 1202 and the sending unit 1204 may be configured to perform steps 702 and 704 (described above in respect of FIG. 7) respectively.

The local NWDAF 1200 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause inputting unit 1202 and sending unit 1204, and any other suitable units of local NWDAF 1200 to perform corresponding functions according one or more embodiments of the present disclosure.

The local NWDAF 1200 may additionally comprise power-supply circuitry (not illustrated) configured to supply the local NWDAF 1200 with power.

Figure 13:
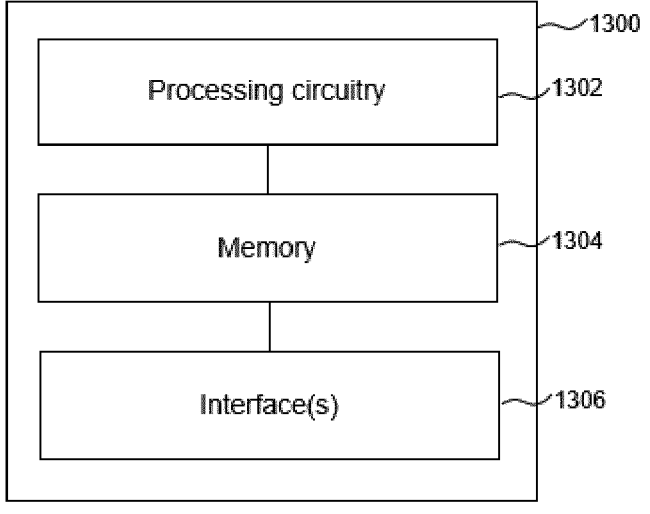
FIGS. 13 and 14 are schematic drawings of an NRF according to embodiments of the disclosure.

FIG. 13 is a schematic diagram of a Network Repository Function (NRF) 1300 for a communications network (e.g. the communications network described above in respect of FIG. 2) according to embodiments of the disclosure. The NRF 1300 may be, for example, the NRF 304 described in respect of FIG. 3 or the NRF 406 described above in respect of FIGS. 4-5. The NRF 1300 may be operable to carry out the example method 800 described with reference to FIG. 8 and possibly any other processes or methods disclosed herein. It is also to be understood that the method 800 of FIG. 8 may not necessarily be carried out solely by the NRF 1300. At least some operations of the method can be performed by one or more other entities.

The NRF 1300 comprises processing circuitry 1302 (such as one or more processors, digital signal processors, general purpose processing units, etc.), a machine-readable medium 1304 (e.g., memory such as read-only memory (ROM), random-access memory, cache memory, flash memory devices, optical storage devices, etc.) and one or more interfaces 1306.

In one embodiment, the machine-readable medium 1304 stores instructions which, when executed by the processing circuitry 1302, cause the NRF 1300 to receive a request, from a first NWDAF in the communications network, to identify an NWDAF in the communications network capable of performing federated learning. The request indicates a model to be developed using federated learning. The NRF 1300 is further caused to send, to the first NWDAF, identifying information for a second NWDAF in the communications network capable of performing federated learning to develop the model.

In other embodiments, the processing circuitry 1302 may be configured to directly perform the method, or to cause the NRF 1300 to perform the method, without executing instructions stored in the non-transitory machine-readable medium 1304, e.g., through suitably configured dedicated circuitry.

The one or more interfaces 1306 may comprise hardware and/or software suitable for communicating with other nodes of the communications network using any suitable communication medium. For example, the interfaces 1306 may comprise one or more wired interfaces, using optical or electrical transmission media. Such interfaces may therefore utilize optical or electrical transmitters and receivers, as well as the necessary software to encode and decode signals transmitted via the interface. In a further example, the interfaces 1306 may comprise one or more wireless interfaces. Such interfaces may therefore utilize one or more antennas, baseband circuitry, etc. The components are illustrated coupled together in series; however, those skilled in the art will appreciate that the components may be coupled together in any suitable manner (e.g., via a system bus or suchlike).

In further embodiments of the disclosure, the NRF 1300 may comprise power circuitry (not illustrated). The power circuitry may comprise, or be coupled to, power management circuitry and is configured to supply the components of NRF 1300 with power for performing the functionality described herein. Power circuitry may receive power from a power source. The power source and/or power circuitry may be configured to provide power to the various components of NRF 1300 in a form suitable for the respective components (e.g., at a voltage and current level needed for each respective component). The power source may either be included in, or external to, the power circuitry and/or the NRF 1300. For example, the NRF 1300 may be connectable to an external power source (e.g., an electricity outlet) via an input circuitry or interface such as an electrical cable, whereby the external power source supplies power to the power circuitry. As a further example, the power source may comprise a source of power in the form of a battery or battery pack which is connected to, or integrated in, the power circuitry. The battery may provide backup power should the external power source fail. Other types of power sources, such as photovoltaic devices, may also be used.

Figure 14:
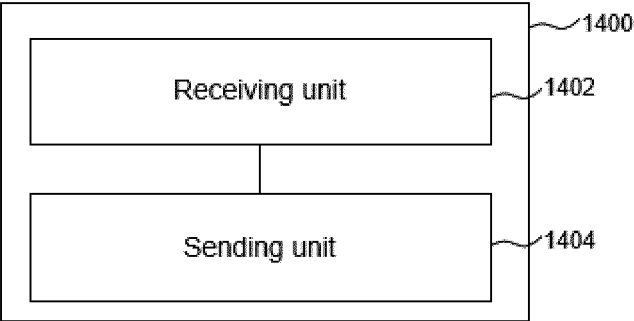

FIG. 14 is a schematic diagram of an NRF 1400 for a communications network (e.g. the communications network described above in respect of FIG. 2) according to embodiments of the disclosure. The NRF 1400 may be, for example, the NRF 304 described in respect of FIG. 3 or the NRF 406 described above in respect of FIGS. 4-5. At least some operations of the method can be performed by one or more other entities.

The NRF 1400 comprises a receiving unit 1402, which is configured to receive a request, from a first NWDAF in the communications network, to identify an NWDAF in the communications network capable of performing federated learning. The request indicates a model to be developed using federated learning. The NRF 1400 further comprises a sending unit 1404, which is configured to send, to the first NWDAF, identifying information for a second NWDAF in the communications network capable of performing federated learning to develop the mode. Thus, for example, the receiving unit 1402 and the sending unit 1404 may be configured to perform steps 802 and 804 (described above in respect of FIG. 8) respectively.

The NRF 1400 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving unit 1402 and sending unit 1404, and any other suitable units of NRF 1400 to perform corresponding functions according one or more embodiments of the present disclosure.

The NRF 1400 may additionally comprise power-supply circuitry (not illustrated) configured to supply the NRF 1400 with power.

It should be noted that the above-mentioned examples illustrate rather than limit the invention, and that those skilled in the art will be able to design many alternative examples without departing from the scope of the appended statements. The word "comprising" does not exclude the presence of elements or steps other than those listed in a claim, "a" or "an" does not exclude a plurality, and a single processor or other unit may fulfil the functions of several units recited in the statements below. Where the terms, "first", "second" etc. are used they are to be understood merely as labels for the convenient identification of a particular feature. In particular, they are not to be interpreted as describing the first or the second feature of a plurality of such features (i.e. the first or second of such features to occur in time or space) unless explicitly stated otherwise. Steps in the methods disclosed herein may be carried out in any order unless expressly otherwise stated. Any reference signs in the statements shall not be construed so as to limit their scope.

The invention claimed is:

1. A method performed by a central Network Data Analytics Function (NWDAF) in a communications network, the method comprising:

identifying a plurality of local NWDAFs in the communications network that are capable of participating in federated training of a machine-learning model using local data, the machine-learning mode including a plurality of parameters having respective values that are updated based on training, and the identifying based the central NWDAF receiving subscription requests from the plurality of local NWDAFs in the communications network, the subscription requests being requests to participate in federated learning with respect to the machine-learning model;

receiving from each one among the plurality of local NWDAFs, a respective local model update that contains only locally updated values of the plurality of parameters, as updated by each local NWDAF via local training of the machine-learning model based on respective local data;

for each parameter among the plurality of parameters, combining the corresponding locally updated values to obtain a respective centrally updated value for the parameter; and distributing the centrally updated values to the plurality of local NWDAFs on a conditional basis, the condition being more than a threshold change in one or more of the centrally updated values.

2. The method of claim 1, wherein, for each parameter among the plurality of parameters, combining the corresponding locally updated values comprises averaging the corresponding locally updated values.

3. The method of claim 1, wherein the subscription requests are received in dependence on the central NWDAF first registering at a Network Repository Function (NRF), with registration of the central NWDAF identifying the machine-learning model for federated training.

4. The method of claim 1, wherein the method further comprises sending a request for a local model update to each of the one or more local NWDAFs, and receiving the respective local model updates in correspondence with the requests.

5. The method of claim 1, further comprising sending to each one among the plurality of local NWDAFs an indication of one or more conditions upon which the local NWDAF is to transmit local model updates to the central NWDAF.

6. The method of claim 1, wherein the method further includes the central NWDAF additionally distributing the centrally updated values to the plurality of local NWDAFs responsive to more than a defined period of time elapsing since a last distribution of centrally updated values to the plurality of local NWDAFs for the machine-learning model.

7. A method performed by a first local Network Data Analytics Function (NWDAF) in a communications network, the method comprising:

joining in federated learning for training a machine-learning model comprising a plurality of parameters, based on receiving information from a Network Repository Function (NRF) of the communications network, the information identifying a central NWDAF that supports federated learning for the machine-learning model, and sending a subscription request to the central NWDAF, requesting participation in the federated learning; and participating in the federated learning by:

inputting local training data into a machine-learning process to train a local copy of the machine-learning model, and wherein training the local copy of the machine-learning model results in locally updated values of the plurality of parameters;

sending a local model update to the central NWDAF, the local model update comprising only the locally updated values; and receiving centrally updated values for the plurality of parameters from the central NWDAF and updating the local copy of the machine-learning model with the centrally updated values, for further local training of the machine-learning model.

8. The method of claim 7, wherein sending the local model update to the central NWDAF comprises sending the local model update responsive to fulfilment of at least one of the following conditions:

more than a threshold change in the locally updated value of one or more of the parameters among the plurality of parameters, or more than a defined amount of time elapsing since sending a most recent prior local model update to the central NWDAF.

9. The method of claim 7, further comprising sending to the central NWDAF an indication of one or more conditions for triggering the central NWDAF to send the centrally updated values.

\* \* \* \* \*